July 21, 1964
C. O. SLEMMONS
3,141,193
APPARATUS FOR MOLDING GRANULATED PLASTIC MATERIAL
Filed March 16, 1962
5 Sheets-Sheet 1
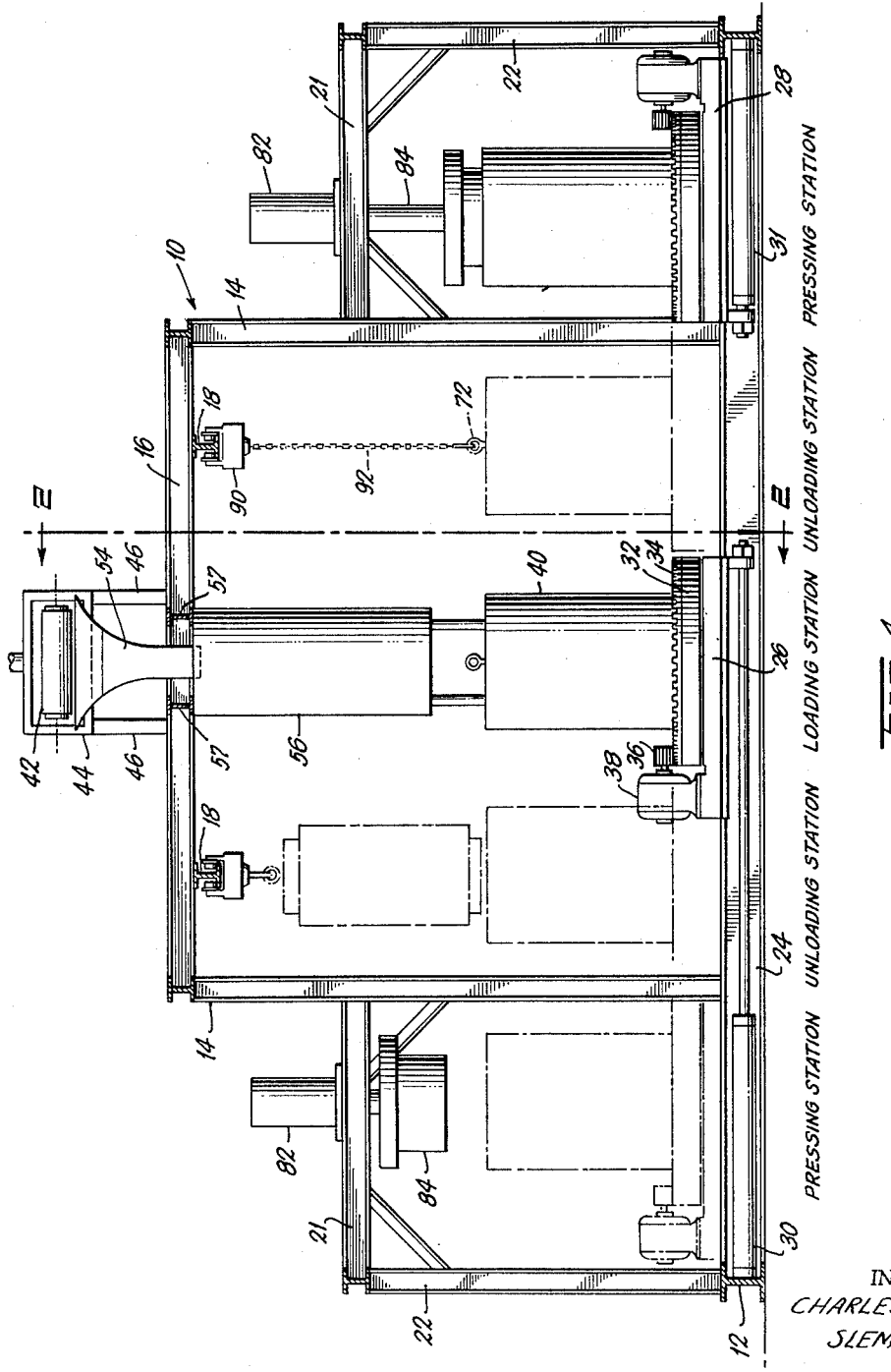
INVENTOR
CHARLES O.
SLEMMONS
BY *Kenow, Palmer, Stewart & Estabrook*
ATTORNEYS

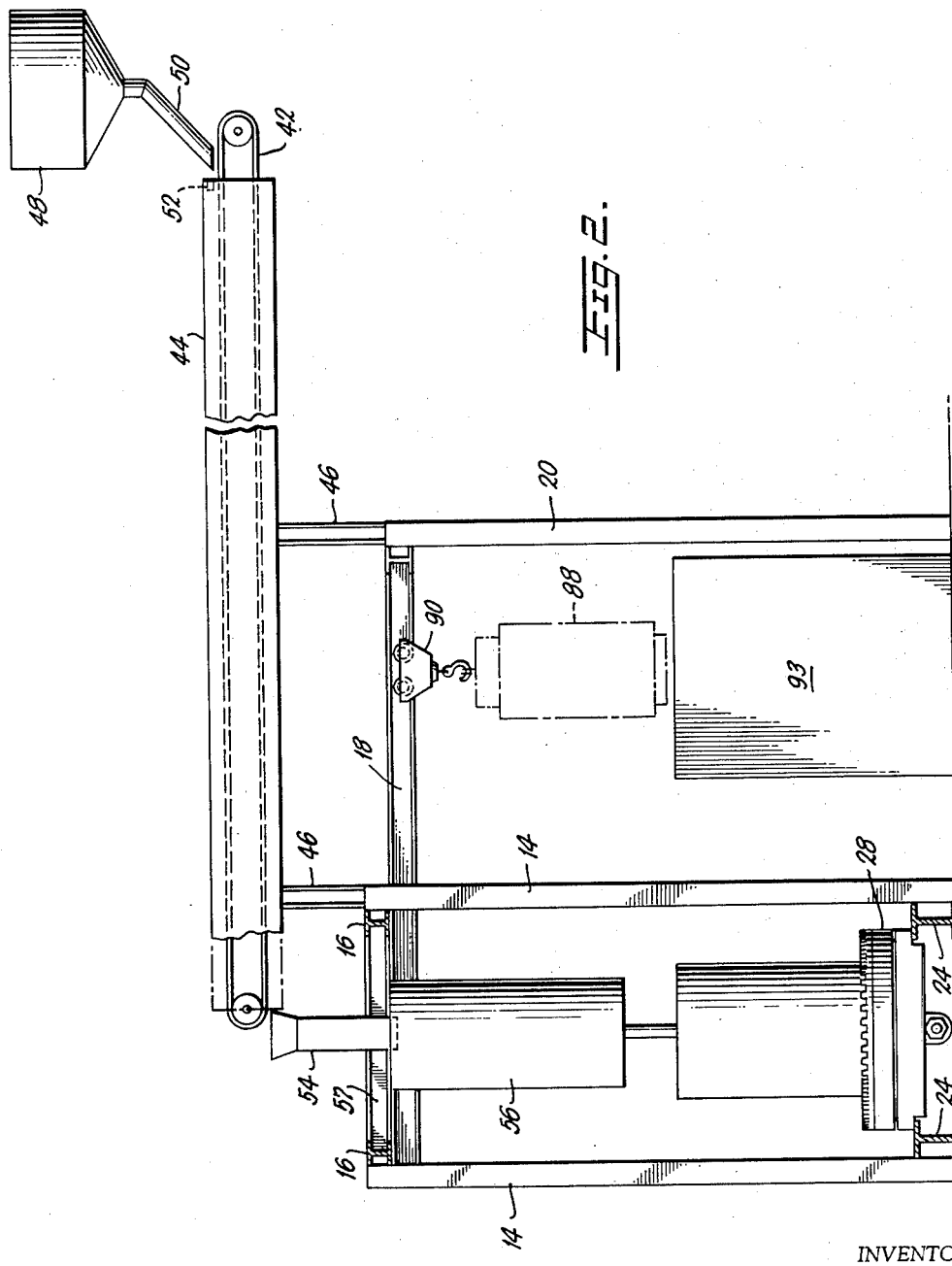

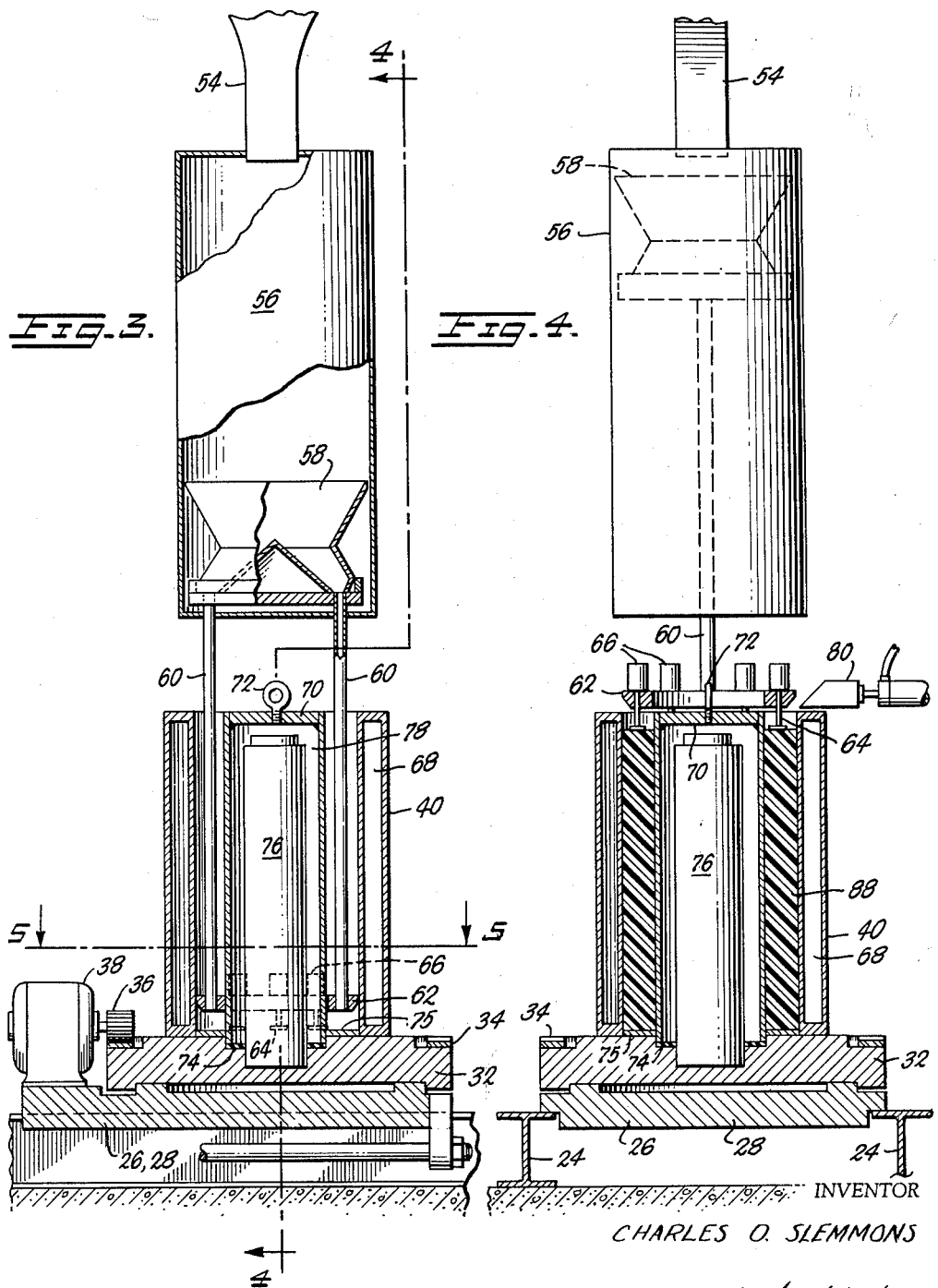

INVENTOR
CHARLES O. SLEMMONS

BY *Kenyon, Palmer, Stewart & Estabrook*

ATTORNEYS

July 21, 1964 C. O. SLEMMONS 3,141,193
APPARATUS FOR MOLDING GRANULATED PLASTIC MATERIAL
Filed March 16, 1962 5 Sheets-Sheet 5
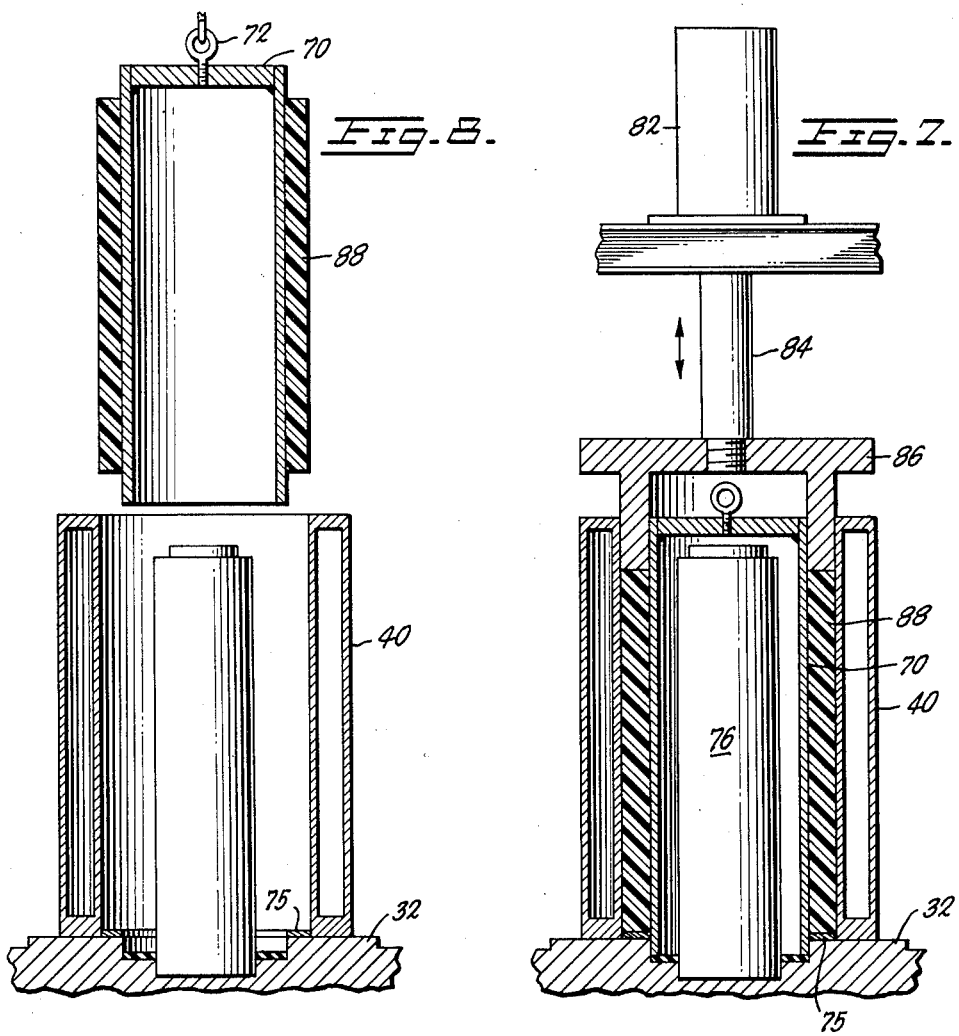
INVENTOR
CHARLES O SLEMMONS
BY
ATTORNEYS

United States Patent Office 3,141,193
Patented July 21, 1964

3,141,193
APPARATUS FOR MOLDING GRANULATED
PLASTIC MATERIAL
Charles O. Slemmons, Akron, Ohio, assignor to The General Tire & Rubber Company, a corporation of Ohio
Filed Mar. 16, 1962, Ser. No. 180,173
7 Claims. (Cl. 18—5)

This invention relates to an apparatus for molding granulated plastic material, and more particularly, it concerns a new and unique apparatus for molding granulated vinyl plastic material to form dense, consolidated bodies of such material for use in the production of terrazzo floor coverings by veneering a web from the periphery of the body.

The term "vinyl plastic" as used herein is intended to encompass polymers of vinyl chloride and copolymers thereof which are polymerizable under the same conditions as vinyl chloride, e.g., a copolymer of vinyl chloride and vinylidene chloride.

Co-pending application Serial No. 180,174, filed March 16, 1962, discloses a method of manufacturing terrazzo floor tiles from vinyl plastic material, which method involves forming an annular body by fusing and molding granulated vinyl plastic prepared from solid blocks of different colors and then separating from the periphery of the body thus formed, a continuous web from which individual tiles may be cut. As pointed out in that application, the formation of a dense, defect-free body or log from which the web is separated is extremely important since the quality of the web and thus the covering or tiles produced is directly dependent on the achievement of these characteristics in the solid annular body. A principal object of the present invention, therefore, is to provide a highly effective apparatus by which such a cylinder-shaped or annular body may be expeditiously formed from granulated vinyl plastic material and which enables the formation of a defect-free body of superior quality.

Another object of this invention is the provision of an apparatus of the type referred to which enables accurate and substantially complete control over the temperature of the vinyl plastic material throughout the log forming process.

A further object of this invention is to provide an apparatus of the type referred to by which the volume of granulated vinyl plastic material as it is introduced into a mold is retained at a minimum prior to pressure fusing thereof into the consolidated annular body.

Another object of this invention is the provision of an apparatus of the aforementioned type by which air pockets and defects resulting therefrom are removed from the granulated vinyl as it is deposited in the mold and thus prior to pressure fusing of the vinyl plastic granules into the consolidated annular body.

A further object of this invention is to provide an apparatus of the referred type by which the time and cost incident to forming a cylinder or hollow log having dense, or void-free walls from granulated vinyl plastic are kept at a minimum.

Still another object of this invention is the provision of an apparatus of the type referred to by which the vinyl plastic material may be expeditiously handled throughout all stages of the formation of the body.

Other objects in further scope of applicability of the present invention will become apparent from the detailed description given hereinafter. It should be understood, however, that the detailed description, while indicating a preferred embodiment of the invention, is given by way of illustration only, since it will become apparent to those skilled in the art from this description that various changes and modifications can be made without departing from the true spirit and scope of this invention.

In general, the preferred form of the apparatus of this invention includes a hopper from which the granulated vinyl plastic is deposited and spread over a belt conveyor which in turn carries the granulated vinyl through a heating oven. The conveyor discharges the heated granulated vinyl plastic material into a mold by way of a vertically movable funnel assembly disposed within an insulating jacket suitably mounted on a frame and positioned above the level of the mold. A pair of depending tubes on the funnel assembly support at their lower ends a ring on which a plurality of tamping devices are mounted, thus enabling the removal of air and partial compaction of the heated vinyl granules during the mold filling operation. The mold is jacketed for the introduction of heating or cooling fluid therein and is supported on a rotatable table which in turn is supported by a laterally movable carriage slidably disposed on ways for positioning at respective loading, pressing and unloading stations. The loading station is positioned under the funnel assembly aforementioned while the pressing station is positioned below a hydraulic ram also mounted on the frame. The unloading station is intermediate the loading and pressing station and disposed below means for removing the molded vinyl plastic material from the mold for transfer to a cooling tank. Also, a carriage is provided to operate on each side of the loading station to permit simultaneous operation of two stations.

A more complete understanding of the apparatus of this invention and its method of use may be had by reference to the accompanying drawings in which:

FIG. 1 is a front elevation illustrating in solid and phantom lines respective positions of the various components of this invention during operation;

FIG. 2 is a cross-section taken on line 2—2 of FIG. 1;

FIG. 3 is an enlarged fragmentary view in partial cross-section depicting the operation at the loading station;

FIG. 4 is a partial cross-section taken along line 4—4 of FIG. 3 and illustrating an advanced stage of the operation at the loading station;

FIG. 6 is a fragmentary perspective view illustrating the granulated material depositing and tamping means of this invention;

FIG. 7 is an enlarged, fragmentary cross-sectional view of the molding apparatus at the pressing station of this invention;

FIG. 8 is an enlarged, fragmentary cross-sectional view depicting the operation of the unloading station of this invention;

Figure 5:
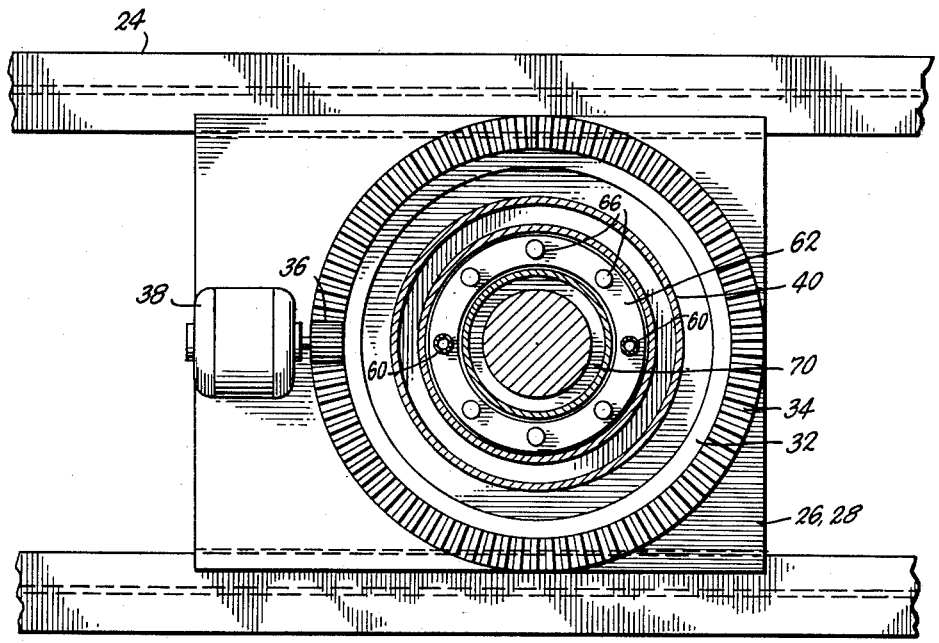
FIG. 5 is a fragmentary cross-sectional view taken on line 5—5 of FIG. 3.
Figure 9:
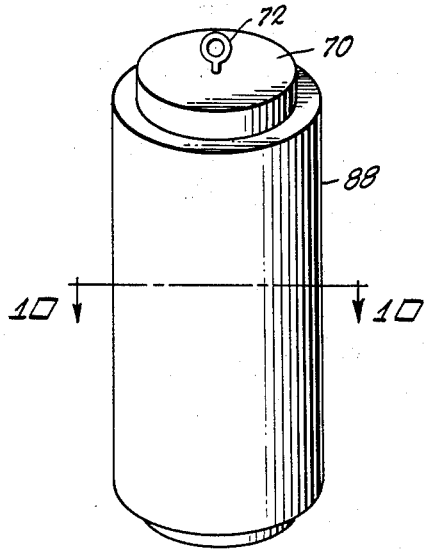
FIG. 9 is a perspective view of the annular body formed by the apparatus of this invention and supported on a central core member.
Figure 10:
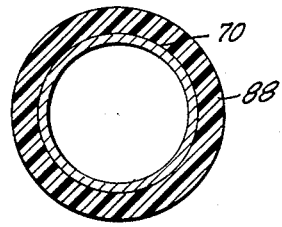
FIG. 10 is a cross-sectional view taken on line 10—10 of FIG. 9.

Referring now to FIGS. 1 and 2 of the drawings, the apparatus of this invention is shown as including a frame generally designated by the numeral 10 and having a base 12. Supported from the base 12 are laterally spaced pairs of uprights or columns 14 supporting opposite ends of horizontal beams 16. A pair of rearwardly extending rails 18 are carried by the beams 16 and by columns 20. On each side of the frame 10 are press mounting platforms 21 supported on their inner sides by the upstanding columns 14 and at their outer ends by columns 22.

Extending transversely of the base 12 are a pair of spaced rails 24 which support slidable carriages 26 and 28 adapted to be moved, as indicated in FIG. 1, between a centrally disposed loading station and respective unloading and pressing stations on each side of the loading station by fluid operated cylinder and piston assemblies 30 and 31 respectively. Each of the carriages 26 and 28 support a rotatable table 32 having an upwardly facing ring gear 34 drivingly engaged by a pinion gear 36 in turn driven by a motor 38 mounted on the respective carriages. Also, the rotary tables 32 on each of the carriages 26 and 28 are arranged to support a cylindrical jacketed mold 40 to be described in more detail hereinafter.

Centrally of the frame 10 and thus at the loading station, a conveyor belt 42 is positioned to extend through a heating oven 44 equipped with suitable radiant, hot air, or other heating means (not shown) and mounted such as by struts 46 at the top of the frame. A hopper 48 suitably supported by means (not shown) is provided with a discharge spout 50 for directing granulated vinyl plastic material onto the belt 42 at the inlet of the heating oven 44 which may be provided with a spreader bar 52 for spreading the material evenly over the upper surface of the belt. The belt 42 at the outlet of the oven 44 discharges into a downwardly directed chute 54 disposed centrally and above a cylindrical insulating jacket 56 depending from beams 57 at the top of the frame 10 above the loading station.

The details of the rotatable table 32, mold 40 and the loading apparatus of which the insulated jacket 56 forms a part are shown most clearly in FIGS. 3 and 4 of the drawing. As shown in FIG. 3, a funnel 58 is arranged for vertical movement within the jacket 56 and is provided with a pair of depending tubes 60 carrying at their lower end a ring 62. The ring 62, in turn, supports a plurality of tampers 64 (see FIG. 6) adapted to be individually driven or reciprocated by suitable means such as motors 66. The mold 40 is, as aforementioned, cylindrical in shape and jacketed to provide an internal chamber 68. Also, a hollow core member 70 having a hoisting ring 72 is concentrically positioned within the mold 40 in a central recess 74 in the table 32. A ring 75 is provided to assure concentricity of the core 70 and mold 40. An upstanding mandrel 76 is anchored centrally on the table 32 to define with the core 70 an open annular space 78 into which heating or cooling fluid may be introduced in the same manner as the chamber 68 of the cylindrical mold 40.

Thus, at the loading station, the granulated vinyl plastic material, having been heated by passage from the hopper 48 through the oven 44 on the conveyor 42, is passed downwardly through the insulated jacket 56 so as to retain substantially its heated condition, through the funnel 58, tubes 60 and into the mold cavity established by the annulus between the core 70 and the cylindrical mold 40. As it is so deposited, the table and thus the mold assembly is continuously rotated by operation of the motor 38 and the granulated vinyl continuously tamped by the tampers 64. In this manner, the heated granules of vinyl plastic are relieved of entrapped air and further are evenly distributed and tamped or partially compacted so that the volume thereof is kept at a minimum as the mold is filled. The funnel 58 will be carried upwardly in the jacket 56 by the action of the tampers 64 which ride on the top of the granulated vinyl deposited in the mold until it reaches a position substantially as shown in FIG. 4 of the drawings. At this point, the ring 62 and tampers 64 are raised clear of the mold 40 by any suitable means such as by a camming device 80.

After filling, the mold assembly is moved to the pressing station illustrated generally in FIG. 1 and in more detail in FIG. 7 of the drawings. As shown, a hydraulic cylinder 82 is supported on the platform 21 for actuating a ram 84 carrying at its lower end an annular pressure member 86. The pressure member 86 is urged downwardly between the core 70 and the interior of the mold 40 to compress and fuse the heated granules of vinyl plastic into a dense, consolidated, annular body 88.

Referring again to FIGS. 1 and 2 and also to FIG. 8, the core 70 and annular body 88 thereon are removed from the mold 40 at the unloading station such as by a winch 90 and chain 92 connected to the hoisting loop 72. The winch 90 is arranged to move rearwardly along the rail 18 to a position above cooling tanks 93.

In operation, the granules or chips suitably mixed as to color are weighed and placed into the hopper 48. Preferably, the weight of the granulated vinyl is correlated to the weight of the body to be formed so that the hopper is fully unloaded upon each filling of the mold. The granules are passed from the hopper into the oven on the conveyor belt 42 as above mentioned and heated at 450° F., the speed of conveyor belt travel and length of the oven being sufficient so that the granules are heated to approximately 350° F. The carriage 26 having been moved to the loading station beneath the chute 54 and insulating jacket 56 will result in the mold 40 thereon being filled with the heated granulated vinyl plastic as above mentioned. During filling, steam or other suitable heating fluid will be introduced into the chambers 68 and 78 to maintain the proper temperature of the granulated vinyl material during filling. Immediately upon being filled to a level such as that shown in FIG. 4, the mold 40 on the carriage 26 is moved by actuation of the cylinder and piston assembly 30 to the pressing station shown to the left of FIG. 1. At the pressing station the annular pressure member 84 is urged downwardly by the introduction of hydraulic fluid into the cylinder 82 to exert an axial force on the vinyl plastic in the mold. As soon as full compression force has been applied, steam is exhausted from the chambers 68 and 70 and a cooling fluid such as water introduced therein. After the material has been held under pressure for a suitable period of time to cause the granules thereof to become fused into the solid body 88, the annular pressure member 86 is raised and the carriage 26 moved to the unloading station. At the unloading station, steam is again introduced into the chamber 68 of the jacketed mold 40 to release the body 88 therefrom. Then, the chain 92 having been attached to the hoisting ring 72 and the core 70 with the body 88 formed thereon removed from the mold 40. The winch 90 is then transferred to the position over the water tank 93 and the body 88 and core upon which it is formed lowered into the water tank for final cooling.

As will be understood by reference to FIG. 1 of the drawings, the provision of two carriages 26 and 28 enables the simultaneous formation of two logs or annular bodies. For example, as shown in solid lines in FIG. 1, while the carriage 26 is located at the loading station the carriage 28 having previously been filled is moved to the pressing station at the right hand side of FIG. 1.

Thus it will be seen that by this invention an extremely effective apparatus is provided by which the above-mentioned objectives are completely fulfilled. Variations from the preferred form of the invention described above, however, will now become apparent to those skilled in the art. It is intended, therefore, that the above description is illustrative only and that various forms and modifications encompassed by this invention are to be established by the appendant claims.

I claim:

1. Apparatus for forming a dense, consolidated annular body from granulated vinyl plastic comprising in combination:
   (a) a frame establishing laterally disposed loading, pressing and unloading stations;
   (b) a heating oven mounted on said frame above said loading station to heat granulated plastic therein;
   (c) at least one carriage mounted on said frame for movement between said stations;
   (d) a mold having an annular cavity therein supported on said carriage;
   (e) means at said loading station for loading said mold with heated granulated plastic from said oven, said means including a plurality of tampers disposable in the cavity of said mold for tamping the granulated plastic as it is loaded into said mold;

(f) means for moving said carriage and said mold between said stations;

(g) an annular pressing member mounted on said frame above said pressing station and disposable in the cavity of said mold to press the tamped granulated plastic to form a dense, consolidated body therein;

(h) and means at said unloading station for removing the formed body of vinyl plastic from said mold.

2. The apparatus recited in claim 1 including a belt conveyor for carrying the granulated plastic through said oven and hopper means for placing the granulated plastic on said conveyor.

3. The apparatus recited in claim 1 including means for rotating said mold on said carriage.

4. The apparatus recited in claim 3 wherein said means for rotating said mold comprises a rotatable table on said carriage, and including further, a removable core supported on said table concentrically within said mold, said core and said mold defining an annular mold cavity.

5. The apparatus recited in claim 4 wherein said core and said mold include walls defining chambers for containing heat transfer fluids.

6. The apparatus recited in claim 1 wherein a pressing and unloading station is provided on each side of said loading station and including a pair of carriages operable between said loading station and the said pressing and unloading stations on respective sides thereof.

7. The apparatus recited in claim 1 including at least one cooling tank on said frame and wherein said means for removing the formed body is operable to place the body into said cooling tank.

References Cited in the file of this patent

UNITED STATES PATENTS

| | | |
|---|---|---|
| 915,331 | Bongardt | Mar. 16, 1909 |
| 1,371,239 | Hammond | Mar. 15, 1921 |
| 1,563,615 | Ellis | Dec. 1, 1925 |
| 2,517,001 | Lewon et al. | Aug. 1, 1950 |
| 3,015,479 | Edberg | Jan. 2, 1962 |